US010399540B2

(12) United States Patent
Gray (10) Patent No.: US 10,399,540 B2
(45) Date of Patent: Sep. 3, 2019

(54) SEAT BELT RETRACTOR WITH ENERGY ABSORBING MECHANISM

(71) Applicant: TK Holdings Inc., Auburn Hills, MI (US)

(72) Inventor: Mark Gray, Auburn Hills, MI (US)

(73) Assignee: JOYSON SAFETY SYSTEMS ACQUISITION LLC, Auburn Hills, MI (US)

( * ) Notice: Subject to any disclaimer, the term of this patent is extended or adjusted under 35 U.S.C. 154(b) by 268 days.

(21) Appl. No.: 15/472,241

(22) Filed: Mar. 28, 2017

(65) Prior Publication Data

US 2018/0281745 A1 Oct. 4, 2018

(51) Int. Cl.
*B60R 22/46* (2006.01)
*B60R 22/28* (2006.01)

(52) U.S. Cl.
CPC .... *B60R 22/4676* (2013.01); *B60R 2022/287* (2013.01)

(58) Field of Classification Search
CPC ............... B60R 22/46; B60R 22/4676; B60R 2022/287
See application file for complete search history.

(56) References Cited

U.S. PATENT DOCUMENTS

| | | | |
|---|---|---|---|
| 6,616,081 B1 | 9/2003 | Clute et al. | |
| 7,240,924 B2 | 7/2007 | Kohlndorfer et al. | |
| 7,273,191 B2 | 9/2007 | Clute et al. | |
| 7,410,113 B2 | 8/2008 | Keller et al. | |
| 7,410,114 B2 | 8/2008 | Webber et al. | |
| 7,946,519 B2 | 5/2011 | Gray | |
| 7,954,854 B2 | 6/2011 | Keller et al. | |
| 8,123,154 B2 | 2/2012 | Singer | |
| 8,128,016 B2 | 3/2012 | Choi et al. | |
| 8,220,735 B2 | 7/2012 | Wang et al. | |

(Continued)

FOREIGN PATENT DOCUMENTS

| | | |
|---|---|---|
| WO | WO 2006/044953 A1 | 4/2006 |
| WO | WO 2009/045132 A1 | 4/2009 |
| WO | WO 2010/139434 A1 | 12/2010 |

OTHER PUBLICATIONS

International Search Report and Written Opinion issued in related International Patent Application No. PCT/US2018/024575, filed Mar. 27, 2018.

*Primary Examiner* — Sang K Kim
(74) *Attorney, Agent, or Firm* — Gordon Rees Scully Mansukhani, LLP (57) ABSTRACT

A seatbelt retractor for a seat belt device in a vehicle. The retractor includes a frame and a spool configured to be fixed to one end of a seat belt webbing so that the webbing may be wound around the spool. The spool is rotatably mounted at both ends to the frame and configured to rotate in a webbing extraction direction and a webbing retraction direction. The retractor includes primary and secondary torsion bars positioned end to end in the spool along an axis of rotation of the spool. The primary and secondary torsion bars are configured to be locked at second ends of the torsion bars opposite to the first end. The first ends of the torsion bars are configured to rotate relative to the second ends so that the primary and secondary torsion bars deform to absorb force when a vehicle acceleration exceeds a predetermined value.

20 Claims, 9 Drawing Sheets

(56) References Cited

U.S. PATENT DOCUMENTS

| | | |
|---|---|---|
| 8,240,591 B2 | 8/2012 | Aihara et al. |
| 8,286,903 B2 | 10/2012 | Ogawa et al. |
| 8,646,717 B2 | 2/2014 | Choi et al. |
| 8,740,125 B2 | 6/2014 | Ogawa et al. |
| 8,955,784 B2 | 2/2015 | Axblom |
| 9,327,681 B2 | 5/2016 | Singer et al. |
| 9,527,476 B2 | 12/2016 | Wigstrom et al. |
| 2002/0070307 A1* | 6/2002 | Hiramatsu .......... B60R 22/4676 242/379.1 |
| 2006/0273210 A1 | 12/2006 | Clute et al. |
| 2007/0075173 A1* | 4/2007 | Boelstler ............. B60R 22/3413 242/379 |
| 2008/0061180 A1 | 3/2008 | Webber et al. |
| 2011/0000996 A1 | 1/2011 | Wigström et al. |

\* cited by examiner

SEAT BELT RETRACTOR WITH ENERGY ABSORBING MECHANISM

GENERAL DESCRIPTION

The present disclosure relates generally to the field of seat belt retractors for spooling seat belt (webbings) for restraining an occupant of a seat system of vehicles and the like. More specifically, this disclosure relates to a retractor having energy absorbing systems.

Certain aspects of the retractor disclosed herein are similar to the retractor disclosed in U.S. Pat. No. 7,946,519 (incorporated by reference herein), which discloses the use of a single torsion bar for energy absorption. As described further herein, the retractor described and shown in the figures of the present application provides for two torsion bars providing parallel load paths for energy absorption with the ability to selectively change the amount of energy absorbed by removing one of the torsion bars from the load path. The arrangement disclosed herein may be configured within the same basic retractor frame arrangement as disclosed in the foregoing patent thereby providing for improved performance with relatively small changes to the complexity, weight and cost of the retractor.

The reference to parallel load paths herein is intended to use the term "parallel" in a similar way to how that term is used for an electric circuit. For example, in a "parallel" load configuration the energy absorbing load devices (e.g., the torsion bars) share the same load force which is applied equally to both devices. In a "series" load configuration each of the energy absorbing load devices share a portion of the total load applied. Thus, the mechanical or material energy load absorption described herein is similar to the electrical load absorbed by parallel or series circuit components when a voltage (i.e., electrical load) is applied to circuit components.

A seatbelt device for use within a vehicle provides safety to an occupant by restraining the movement of the occupant during a sudden acceleration, typically resulting from a dynamic impact event of the vehicle. A typical seatbelt device includes a webbing or belt, a buckle, a tongue member to engage the buckle, a retractor, and an anchor member. Retractors include a spool and through the use of a force, often generated by a spring, wind the webbing around the spool. During a dynamic impact event of the vehicle, the retractor locks the webbing from extracting or unwinding, which restricts movement of the occupant.

A retractor may include a pretensioner and a locking mechanism. The pretensioner includes a pyrotechnic charge that rapidly generates gas during a vehicle dynamic event to create pressure to move a piston that may drive a rack, ball bearings, or any other member that may be coupled to a pinion gear through a teeth mesh. The pinion may be coupled directly or indirectly, through a member or hub, to a torsion shaft coupled to the spool, whereby rotation of the pinion transmits torque through the torsion shaft into the spool, creating torque to retract the webbing. This pretension applied to the seatbelt removes the slack between the webbing and the occupant, therefore reducing the movement that the occupant may undergo during the dynamic impact event. The pretensioner may be deployed when sensors on the vehicle detect an impact event and are typically designed to deploy at high speed impacts. The locking mechanism may include a locking pawl driven by a force, from a spring or inertia, and having teeth to mesh with teeth of the frame member under low speed impacts, thus preventing the rotation of the spool and preventing the seatbelt from extracting. A locking pawl may be coupled to the torsion bar indirectly through other members. The torsion bar is designed to deform torsionally when subjected to a predetermined torque to absorb energy during loading, imparted by the mass of an occupant during acceleration of the vehicle, to reduce the restraint force exerted on the occupant during the dynamic impact event, thereby providing improved safety to the occupant.

A retractor may include one or more torsion bars. Certain retractors include two torsion bars to allow for load shifting. In some retractors, the torsion bars carry the load in series and, as a result, when the load shift is triggered there is a greater and longer duration drop in a load curve that depicts load absorbed vs. time. For example, contrast the load curve A with the load curve B shown in FIG. 10. The load curve B, for the series load retractor, has a greater and longer drop in the load absorbed than the load curve A, which is associated with a parallel load retractor such as disclosed in this application.

Accordingly, an object of the present disclosure is to provide a cost effective, space efficient, and relatively straightforward operating retractor that provides for carrying the load on the torsion bars in parallel. Initially, both of the torsion bars carry the load in parallel. At a designated time determined, for example, by occupant size, crash severity, etc., the retractor shifts to disconnect one of the torsion bars and have the load carried by a single torsion bar.

BRIEF DESCRIPTION OF THE DRAWINGS

The features, aspects, and advantages of the present invention will become apparent from the following description, and the accompanying exemplary embodiments shown in the drawings, which are briefly described below.

DETAILED DESCRIPTION

According to one embodiment of the disclosure, the retractor comprises two independent mechanisms to transfer or absorb torque. For a low acceleration event, the torque is absorbed to prohibit extraction of the webbing to mitigate the movement of the occupant to improve safety. Webbing extraction is prohibited by locking rotation of the spool in the extraction direction by loading at least one coupler pawl between a spool and a locking mechanism. The locking mechanism includes a lock base and a locking pawl, having teeth that engage teeth of a locking ring, thus preventing rotation of the locking mechanism.

For a high acceleration event, a torque is generated by a pretensioner to retract the webbing of the seat belt system to remove clearance between the webbing and the occupant to mitigate movement of the occupant to improve safety. The pretensioner may be pivotally coupled to a pinion and thereby rotates the pinion (in the webbing retraction direction), which is also pivotally coupled to a torsion bar thereby transferring rotation to the torsion bar. The torsion bar is also pivotally coupled, thereby transferring the torque, to a torsion bar cam, which contacts the coupler pawls, which also contact the spool, prohibiting rotation of the spool in the webbing extraction direction. The pretensioner is non-reversible so, after the pretensioner initiates, the pretensioner mechanism cannot rotate in the webbing extraction direction and the second end of the primary torsion bar is locked.

Two torsion bars may be provided. The first end of each torsion bar is locked to the spool, through the torsion bar cam. The first ends of the torsion bars are subjected to a torque in the webbing extraction direction resulting from the force of the occupant being decelerated into the webbing. The torsion bars absorb this torque, from the occupant, and deform elastically and plastically to manage the energy from the occupant and to mitigate the resultant force being transmitted back into the occupant. This mitigation of the force on the occupant through the torsion bars improves occupant safety.

Figure 1:
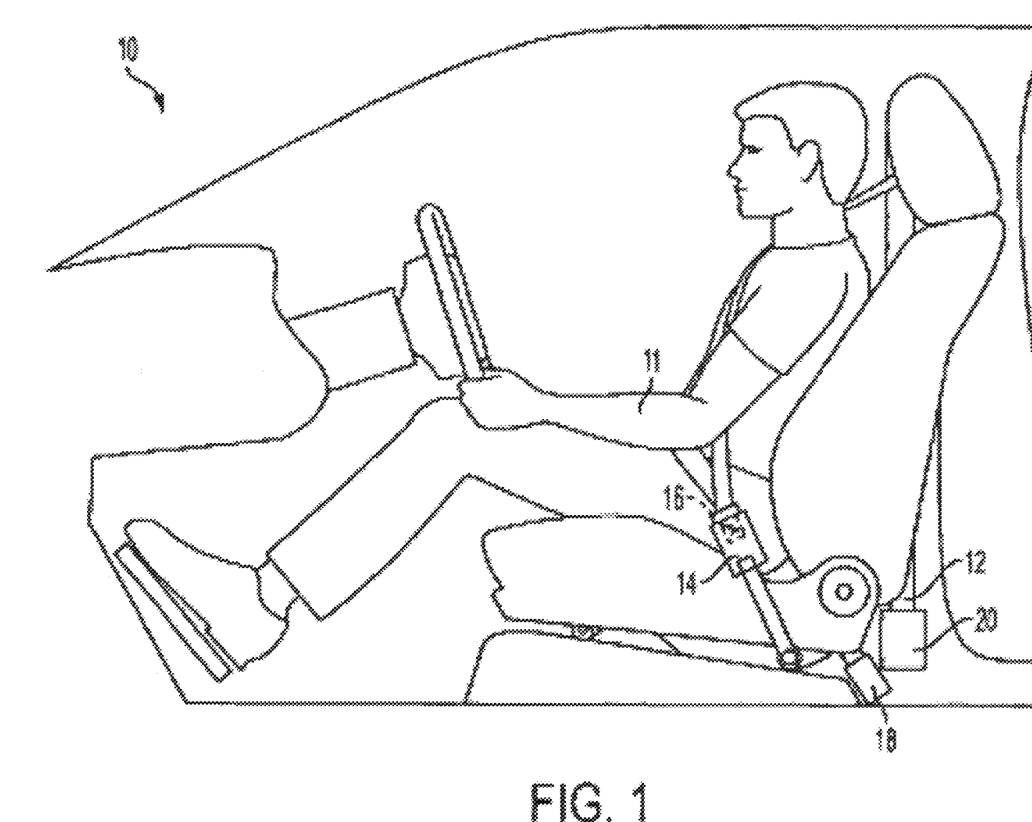
FIG. 1 is a side view of a vehicle showing a seat belt system including a retractor according to an exemplary embodiment.

Referring to FIG. 1, a seat belt system 10 is shown according to an exemplary embodiment. The seat belt system 10 is employed within a vehicle to help restrain the movement of an occupant 11 during a sudden acceleration, typically resulting from a dynamic impact event of the vehicle. The term acceleration refers to the absolute value of the acceleration that the vehicle experiences, whether negative (e.g., deceleration) or positive. The seat belt system 10 includes a webbing or a belt 12, a buckle 14, a tongue member 16 to engage the buckle 14, an anchor member 18, and a retractor 20. During a dynamic impact event of the vehicle, the retractor 20 locks the webbing from extracting or unwinding, which restricts movement of the occupant. The seat belt system 10 includes one or more sensors (not shown) configured to detect a sudden acceleration of the vehicle. The sensor(s) is configured to send a signal to a controller (not shown) for the retractor 20 to activate the retractor 20 as appropriate depending on whether the sensor detects a low or high acceleration event.

Figure 6:
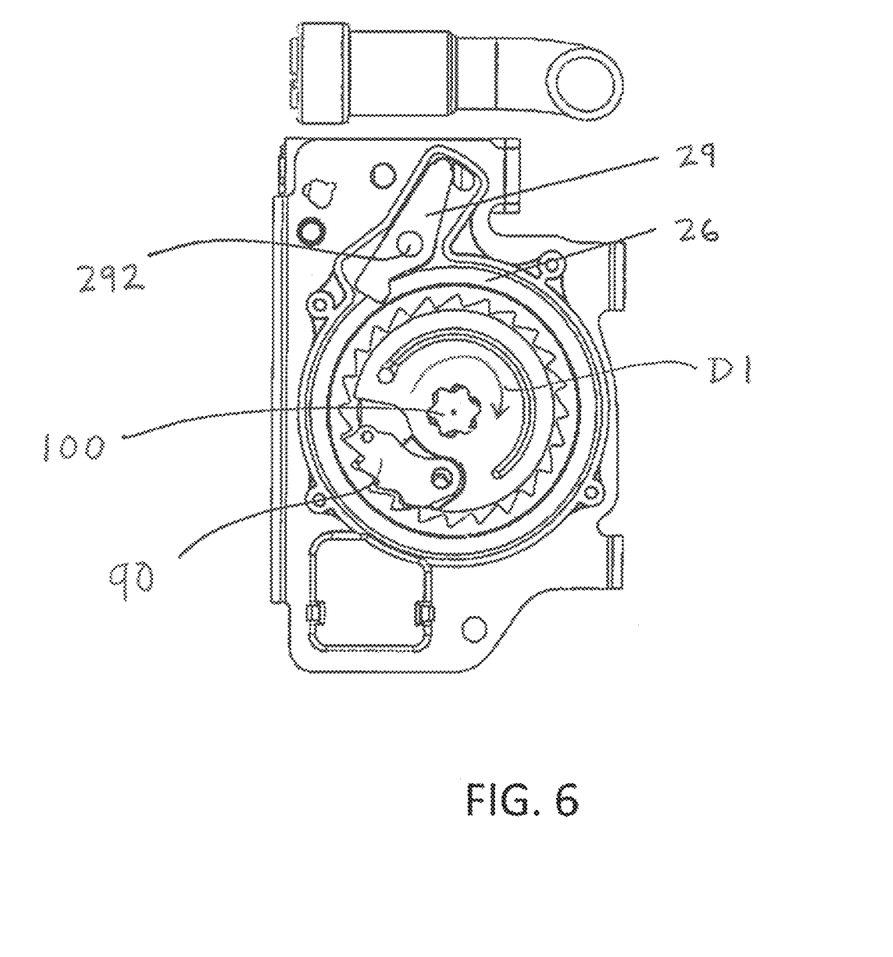
FIG. 6 is a side view of the locking mechanism of the retractor of FIG. 2.

Referring to FIGS. 2-10, a retractor 20 is shown that includes a pretensioner 22, a frame 24, and a spool assembly 28. The spool assembly 28 comprises a pinion 30, a spool 40, at least one coupler pawl 50, a primary torsion bar 60, a secondary torsion bar 61, a torsion bar cam 70, a lock base 80, and a lock pawl 90. The pinion 30, torsion bars 60, 61, torsion bar cam 70, locking base 80, and spool 40 share a substantially common pivot axis 100 (FIG. 6). This pivot axis 100 is about which the webbing 12 of the seat belt system 10 may be extracted or retracted. The pretensioner 22 may be constructed according to known methods. For example, the pretensioner may be a ball-type pretensioner. The pretensioner 22, may include a coupling member 23 (e.g., a spherical or ball member) to drive rotational motion of an external pretensioner ring 27 and internal pretensioner ring 25 and ultimately rotation of the pinion 30 during pretensioner deployment. The pretensioner 22 is non-reversible so that, once the pretensioner 22 deploys to retract the webbing 12 of the seat belt system 10, the pretensioner 22 may not be rotated in the webbing extracting direction Dl.

The pinion 30 may be made from steel or any other material strong enough to transmit the high torque generated by the pretensioner 22 and may be made by conventional methods (e.g., forging, broaching, machining). The pinion 30 includes a first and a second end, whereby the first end may be pivotally coupled to the pretensioner 22. The torque generated by the pretensioner 22 during deployment is transferred into the pinion 30. The second end of the pinion may be pivotally coupled to the second end 64 of the primary torsion bar 60. The pinion may also include a bearing surface on its outer diameter that may couple to the inner surface of the second end of the spool 40 to provide substantial concentricity between the pinion 30, torsion bars 60, 61 and spool 40, for smooth rotation of the spool assembly. The construction of the pinion 30 is not limited to that disclosed above, and may be constructed from any geometry which transmits the required torque to another member.

The torsion bars 60, 61 may be made from steel or other material strong enough to transmit the high torque generated by the pretensioner 22 and may be made through conventional methods (e.g., forging, broaching, machining). The torsion bars 60, 61 may vary in size as required for the load absorbing requirements. The torsion bars 60, 61 may be the same size or may (for example, as shown in the drawings) by configured so that one torsion bar is larger and capable of absorbing more energy and carrying more load than the other torsion bar. The larger or longer torsion bar may be positioned adjacent to the pretensioner 22 (as shown) or, in the alternative adjacent to the lock base 80.

The primary torsion bar 60 includes a first and a second end, whereby the first end, having a male key-way 62, may be pivotally coupled to first end of the torsion bar cam 70. The second end of the primary torsion bar 60, having a male key way 64, may be coupled to the second end of the pinion 30, having a female key-way 34. The primary torsion bar 60 is configured to be locked at the second end and to rotate with the spool 40 at the first end to thereby absorb a predetermined torque, which provides energy management through first elastic deformation, then by plastic deformation, as it yields under the torque generated by the extracting belt force resulting from the force of the occupant being decelerated during a vehicle impact event. The construction of the primary torsion bar 60 is not limited to that disclosed above, and may be constructed from any geometry which transmits the required torque to another member. For example, according to other embodiments, the first end of the primary torsion bar 60 may have a female key-way that may be pivotally coupled to the first end of the torsion bar cam 70, having a male key-way or other useful shape to transmit torque.

The secondary torsion bar 61 includes a first and a second end, whereby the first end, having a male key-way 63, may be pivotally coupled to the torsion bar cam 70. The second end of the secondary torsion bar 61, having a male key way 65, may be coupled to the lock base 80. The secondary torsion bar 61 is configured to be locked at the second end and to rotate with the spool 40 at the first end to thereby absorb a predetermined torque, which provides energy management through first elastic deformation, then by plastic deformation, as it yields under the torque generated by the extracting belt force resulting from the force of the occupant being decelerated during a vehicle impact event. The construction of the secondary torsion bar 61 is not limited to that disclosed above, and may be constructed from any geometry which transmits the required torque to another member.

The torsion bar cam 70 may be made from steel or other material (e.g., zinc) strong enough to transmit the high torque transferred through the primary torsion bar 60 from the pretensioner 22 and may be made through conventional methods (e.g., cast, forged then broached, machined). The torsion bar cam 70 includes a bearing surface on its outer diameter, which is configured to contact bearing surfaces on the inside of the spool 40.

According to the exemplary embodiment shown, torque input into the torsion bar cam 70 upon initiation of the pretensioner, causes the torsion bar cam 70 to drive the coupler pawls 50 outward in a radial direction, such that the contact surfaces of the coupler pawls 50 disengage from mating contact surfaces of the lock base 80. The disengagement of the coupler pawls 50 allows the spool 40 to move independently of the lock base 80 when the pretensioner 22 is fired. Thus, when the spool 40 rotates the torsion bar cam 70 also rotates and the first ends of the torsion bars 60, 61 rotate. The second ends of the torsion bars are fixed in position causing the torsion bars to twist and creating a smooth and controlled energy management by carrying the load through the torsion bars.

The lock base 80 may be made from steel or other material (e.g., zinc) strong enough to transmit the torque transferred through the lock base 80 during low acceleration events, where the pretensioner 22 is not initiated, and may be made through conventional methods (e.g., cast, cold forged, machined). The lock base 80 includes contact surfaces, which contact the coupler pawls 50 to prevent rotation of the spool 40 in the webbing extraction direction during low acceleration events. The coupler pawls 50 pivot out of engagement during high acceleration events in which the pretensioner is initiated to rotate the cam 70, thereby allowing rotation of the spool 40 and torsion bar cam 70 relative to the lock base 80. The exterior side of the lock base includes a pivot surface for the locking pawl 90 to attach and pivot about, and further includes guide surfaces which the locking pawl 90 rotates within.

The lock or locking pawl 90 may be made from steel or other material (e.g., zinc) strong enough to transmit the torque transferred through the locking pawl 90 from low acceleration events and may be made through conventional methods (e.g., cast, forged then broached, machined). The locking pawl 90 includes a pivot (e.g., a post) that pivotally couples the locking pawl to the lock base 80. The locking pawl 90 further includes teeth formed on the exterior to engage the interior teeth on the locking ring 26 during low acceleration events to prevent extraction of the webbing of the seat belt system 10. When the teeth of the locking pawl 90 engage the teeth of the locking ring, rotation of the lock base 80 in the webbing extraction direction is prohibited, thus prohibiting rotation of the second end of the secondary torsion bar 61. The locking pawl 90 rotates to engage or disengage the teeth of the locking ring 26 based upon information received by an acceleration or inertial sensor (e.g., a standing man type sensor). The locking pawl 90 moves due to vehicle acceleration.

When the pretensioner is not initiated, the spool 40 is connected to the lock base 80 by the couple pawls 50. If an acceleration event of a predetermined significance occurs (and the pretensioner does not initiate), the locking pawl 90 will rotate to engage the teeth of the locking ring 26 and lock the spool 40. The load on the webbing is absorbed, at least in part, by the frame 24, locking pawl 90, lock base 80, coupler pawls 50, and spool 40. The locking ring 26 is prevented from rotating by a locking ring release pawl 29, shown in FIG. 6. The locking ring release pawl 29 engages a corresponding detent or cutout 261 in the exterior circumferential edge of the locking ring 26. The locking ring release pawl 29 may be pivoted out of engagement with the locking ring 26 in order to allow the locking ring 26 to rotate. The release pawl 29 is pivotally mounted on the retractor frame 24 and is operated by activation of a release mechanism 130 that includes a piston.

Figure 2:
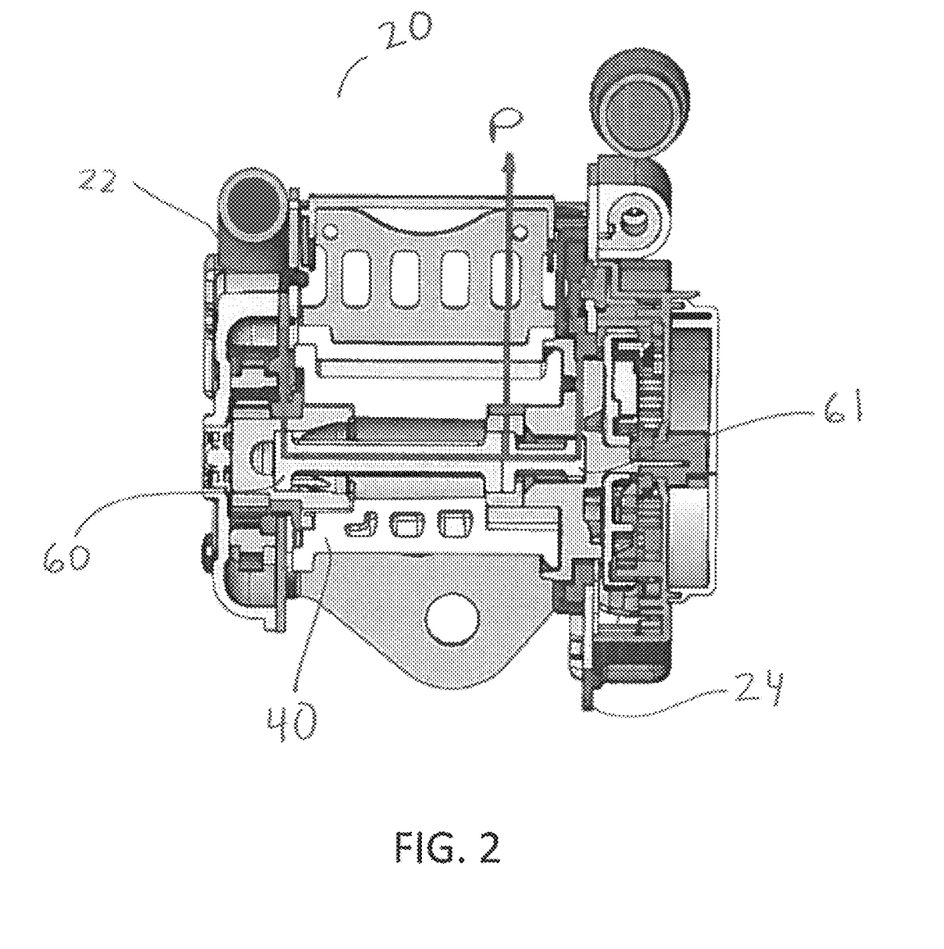
FIG. 2 is a section view of an exemplary embodiment of a retractor with pretensioned spool, for use within a vehicle.
Figure 3:
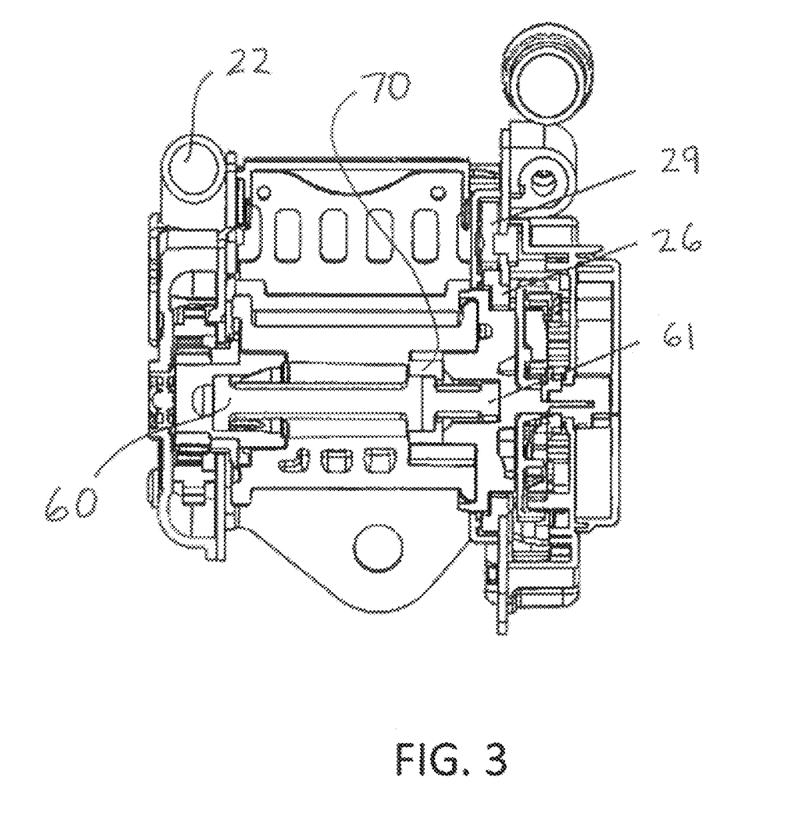
FIG. 3 is a section view of the retractor of FIG. 2.
Figure 4:
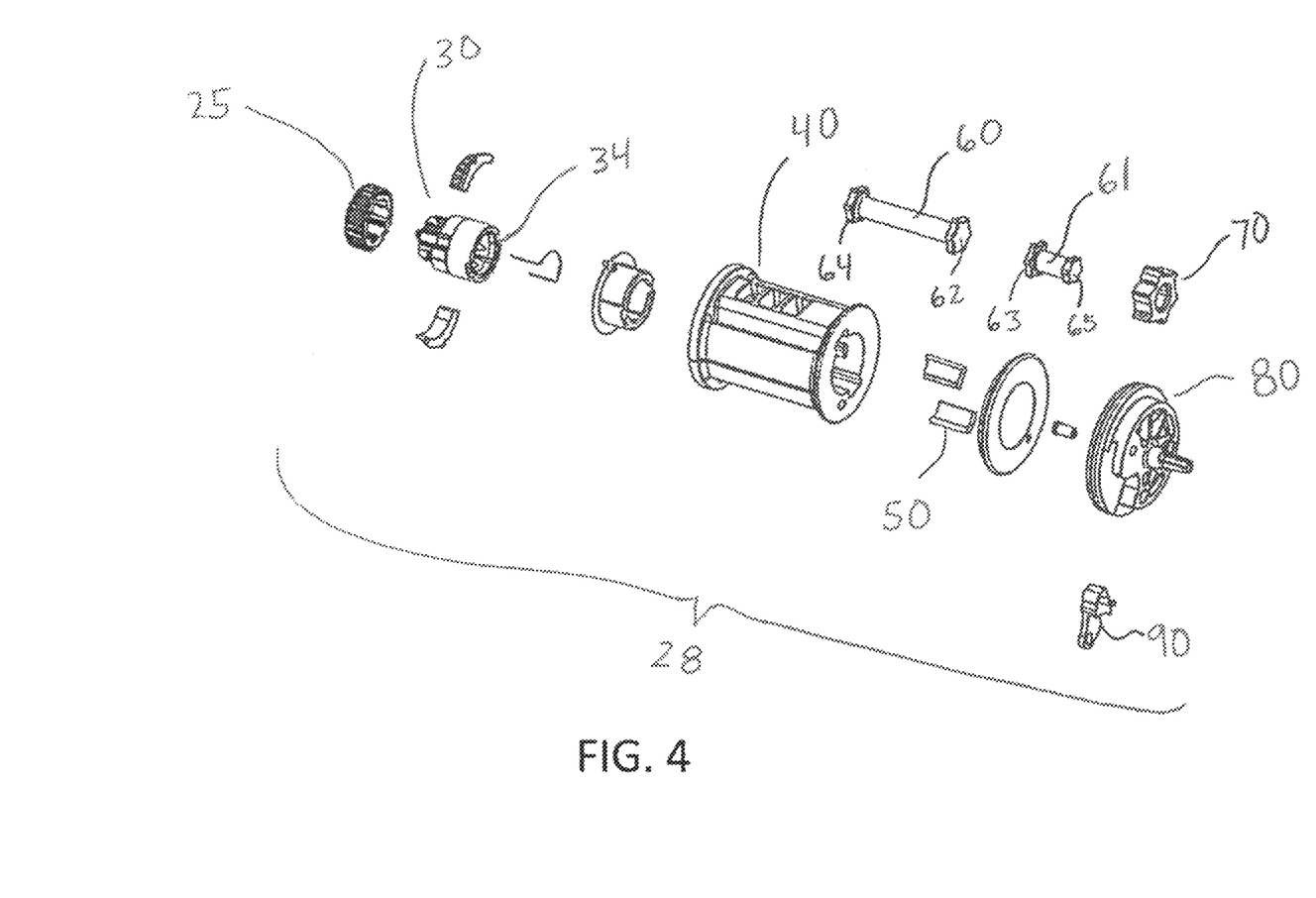
FIG. 4 is an exploded view of the spool portion of the retractor of FIG. 3.
Figure 5:
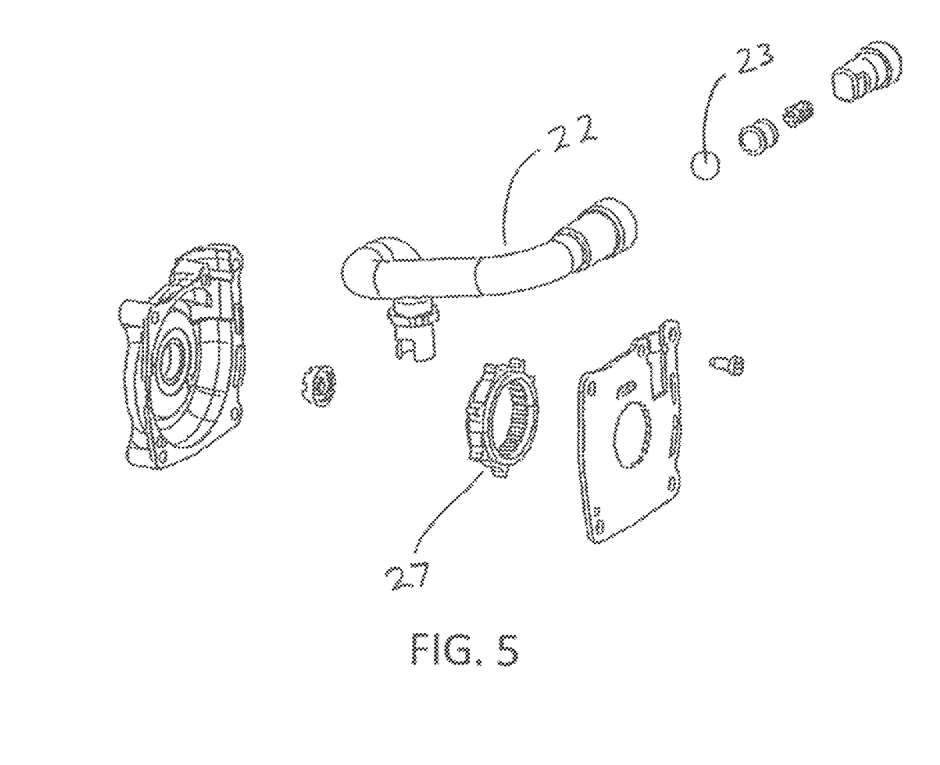
FIG. 5 is an exploded view of the pretensioner portion of the retractor of FIG. 3.

FIG. 2 illustrates a retractor 20 having a pretensioned spool 40, showing the load path P taken by forces exerted on the seat belt webbing 12 by an occupant 11, during a high acceleration impact whereby the pretensioner 22 is fired. This load path P follows from the belt 12, into the spool 40, and into the torsion bar cam 70. From the cam 70, the load path includes two parallel portions. The first load path portion travels through the primary torsion bar 60, into the pinion 30, then into the pretensioner 22. The second load path portion travels through the secondary torsion bar 61 into the lock base 80, locking ring 26 and frame 24. The webbing 12 is fixed to the spool 40, and then wound around the spool 40 as the spool 40 rotates about the pivot axis. The load is transferred from the spool 40 directly into the torsion bar cam 70. The torque generated by the pretensioner 22 rotates the pinion 30 in a direction opposite to the extracting direction which in turn rotates the primary torsion bar (and torsion bar cam 70) in a direction opposite to the extracting direction. This torque then induces rotation of the spool 40 in a direction to retract the belt which removes slack between the belt 12 and occupant 11, thereby mitigating the initial allowable deflection or movement of the occupant 11 during a high acceleration event.

After the initial deployment of the pretensioner 22, the force generated by the decelerating occupant 11 imparts a force on the webbing 12 of the seat belt system 10 in the webbing extracting direction. This force generates a torque transferred from the spool 40, through the torsion bar cam 70, and into the torsion bars 60, 61.

The rotation of the torsion bar cam 70, in the webbing retraction direction, drives the coupler pawls 50 out of engagement with the lock base 80. With the pawls 50 disengaged from the lock base 80 and with the torsion bar cam 70 contacting the spool 40, the spool 40 may rotate in the webbing extracting direction, as the torsion bars 60, 61 deform.

The second end of the primary torsion bar 60 is held fixed by the pinion 30, which is held fixed by the pretensioner 22, since the pretensioner 22 is non-reversible. The second end of the secondary torsion bar 61 is held in position by the lock base 80 which is fixed in the locking ring 26 by the locking pawl 90. The locking ring 26 is prevented from rotating relative to the frame by a locking ring release pawl 29. The first end of the torsion bars 60, 61 may rotate, with respect to their fixed second ends, at a predetermined torque, from elastic deformation and then from plastic deformation, after yielding, of the torsion bars 60,61. This deformation allows for the webbing 12 to extract a certain amount and mitigate the forces exerted on the occupant 11 during the acceleration event. This mitigation of forces exerted on the occupant 11 provides a smooth energy management method and improves safety to the occupant 11.

The system provides for energy absorption using one or two torsion bars. In an exemplary embodiment, initially both torsion bars are locked at one end thereby allowing both torsion bars 60, 61 to absorb energy by twisting. In the disclosed embodiment, the torsion bars 60, 61 are coaxially located at locked at opposite sides of the retractor. The retractor may be configured to operate with a single torsion bar (or shift to operate with a single torsion bar) by unlocking the secondary torsion bar 61 and allowing the secondary torsion bar 61 to rotate with the spool 40.

The secondary torsion bar 61 is locked at the second end because the locking ring 26 is restrained from moving. In order to remove the secondary torsion bar from the load absorbing path, the second end of the secondary torsion bar 61 may be allowed to rotate by allowing the locking ring 26 to rotate. The locking ring 26 may be allowed to rotate when the locking ring release pawl 29, shown in FIG. 6, is pivoted out of engagement with the locking ring 26. The release pawl 29 is pivotally mounted on the retractor frame 24 via a post 292 and is operated by activation of a release mechanism 130.

The retractor includes a locking ring release mechanism. The locking ring release mechanism 130 includes a piston 110 and locking ring release pawl 29 mounted to the retractor frame 24. The locking ring release pawl 29 normally engages with the locking ring 26 to prevent rotation of the locking ring 26 and the second end of the secondary torsion bar 61. When unlocking of the secondary torsion bar 61 is desired in order to reduce the amount of energy being absorbed and to remove the secondary torsion bar 61 from the load path, the release pawl 29 is forced to rotate out of engagement with the locking ring 26.

Figure 7:
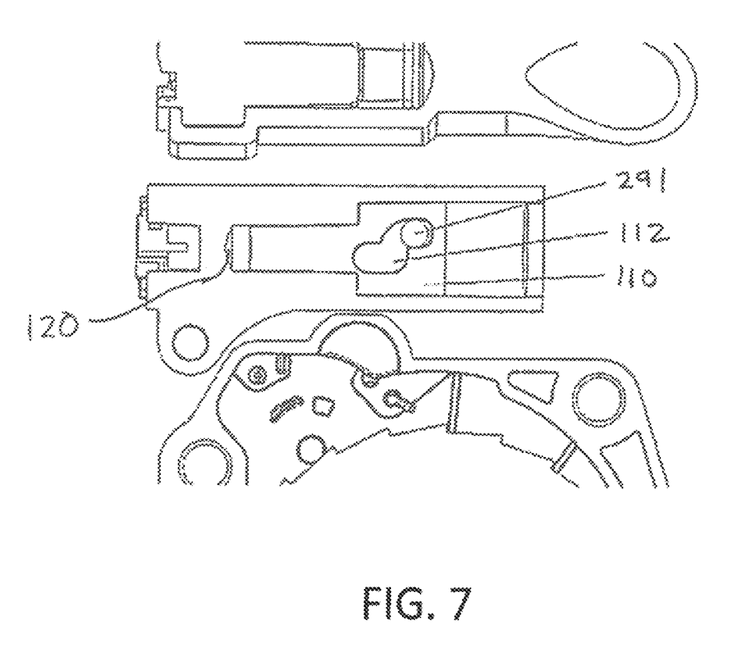
FIG. 7 is a partial view showing the piston for unlocking the locking ring of FIG. 6.
Figure 8:
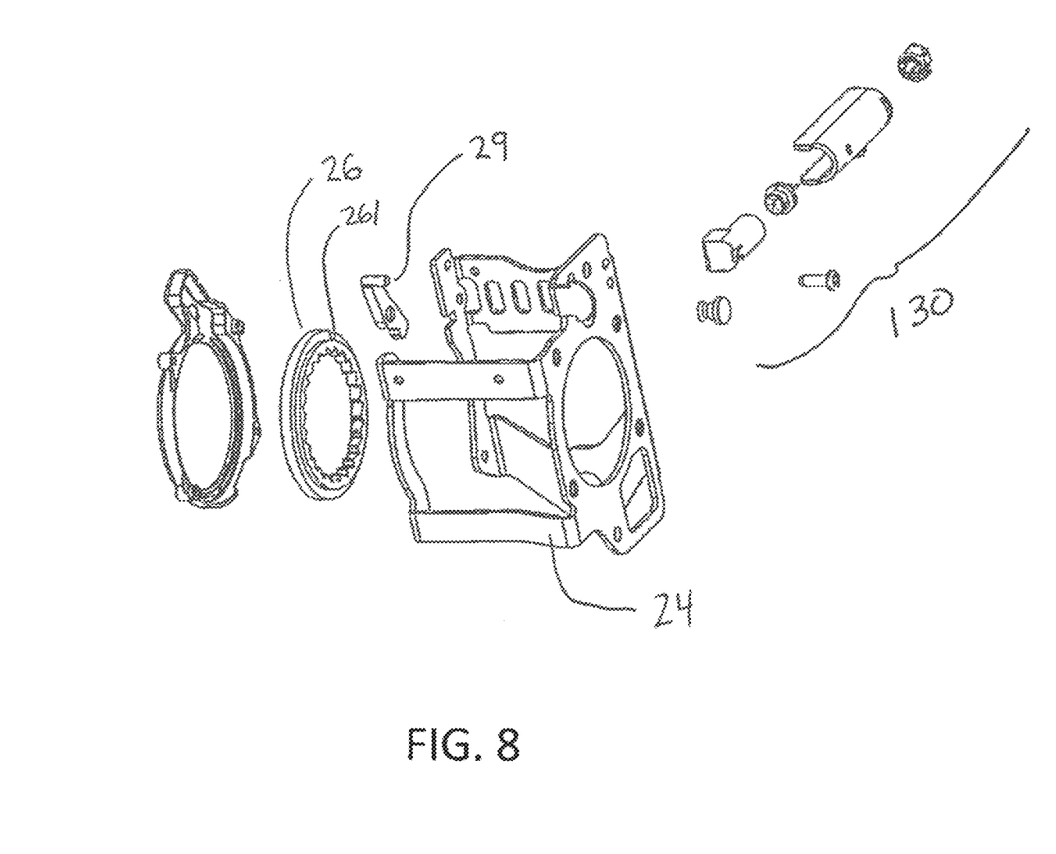
FIG. 8 is an exploded view of the locking ring and piston portion of the retractor of FIG. 3.
Figure 9:
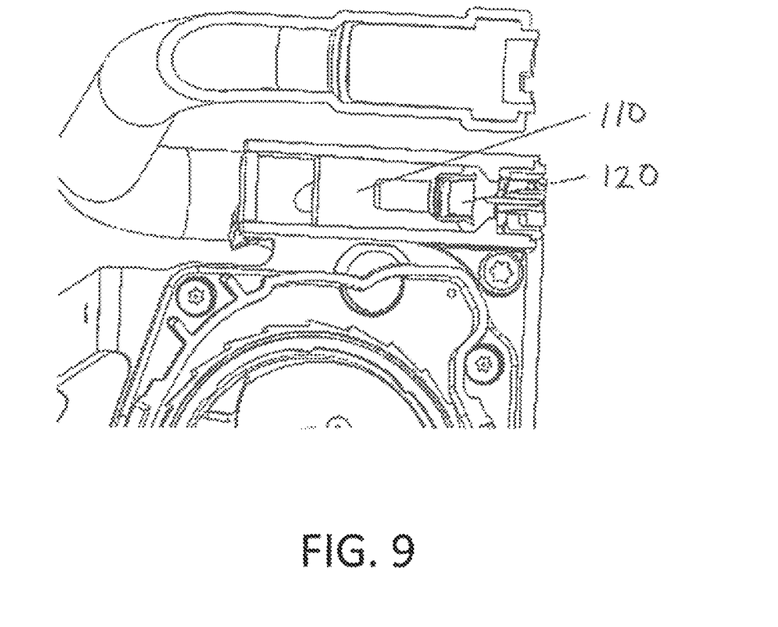
FIG. 9 is a partial sectional view showing the piston for disengaging the locking ring release pawl of FIG. 6 and the pyrotechnic for driving the piston.

As show in FIG. 7, the release pawl 29 is engaged with a piston 110 mounted on the retractor frame 24. The piston 110 is slidably mounted in a cylinder and is driven by the ignition of a pyrotechnic 120. The pawl 29 includes a post 291 that engages with a slot 112 in the piston 110. As the piston is driven (to the right in FIG. 7) by the force provided by the activated pyrotechnic 120, the post 291 of the pawl 29 is repositioned (down and left in FIG. 7) causing the pawl 29 to rotate around the pivot 291 (see FIG. 6) and, as a result, the pawl 29 disengages from the locking ring 26. After the pawl 29 rotates, the locking ring 26 (and secondary torsion bar 61) is free to rotate with the spool 40 relative to the frame 24. Thus, after activation of the piston 110, the secondary torsion bar 61 no longer absorbs energy and carries load. The locking ring release mechanism described above may be activated in response to various vehicle and occupant sensors in order to provide the appropriate energy absorption capability based on, for example, time elapsed after pretensioner initiation, crash severity, occupant position, and occupant size.

Figure 10:
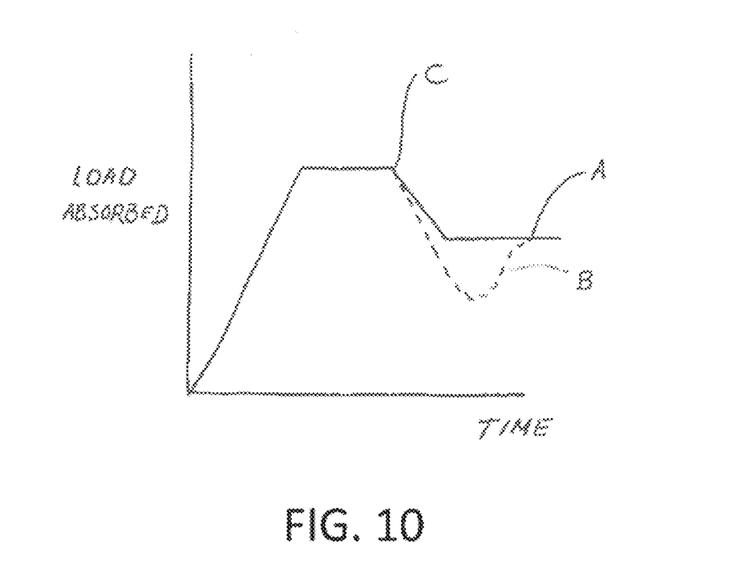
FIG. 10 is a graphical depiction of the energy absorbed by a seat belt retractor.

Thus, according to an exemplary embodiment, the retractor may be configured to absorb load in at least three different configurations that are described above. In a first configuration, in which lower loads are anticipated, the pretensioner 22 is not activated and the spool 40 (and both torsion bars 60, 61) is fixed in position and prevented from rotating. In a second configuration, the pretensioner 22 is activated and the spool 40 is released from the locking base 80 and is free to rotate relative to the frame 24. Both of the torsion bars 60, 61 are fixed at one end, and may twist to absorb load as the second ends of the torsion bars 60, 61 rotate with the spool. In a third configuration, the secondary torsion bar 61, is removed from the load path by allowing the lock base 80 and second end of the secondary torsion bar 61 to rotate so that neither the first end nor the second end of the secondary torsion bar is fixed. The transition from the second configuration to the third configuration may be initiated by activation of a pyrotechnic to drive the piston 110 and rotate the locking ring release pawl 29 to release the locking ring 26. As mentioned above, the activation of the locking ring release mechanism can occur at a predetermined set point(s) based on, for example, occupant size, position, and/or crash severity. FIG. 10 depicts the initiation of the locking ring release mechanism at point "C" in the graph.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the retractor with pretensioned spool as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:
1. A seatbelt retractor for a seat belt device in a vehicle, the retractor comprising: a frame;

a spool configured to be fixed to one end of a webbing so that the webbing may be wound around the spool, the spool being rotatably mounted at both ends to the frame and configured to rotate in a webbing extraction direction and a webbing retraction direction;

a primary torsion bar positioned in the spool, a first end of the primary torsion bar being coupled to a torsion bar cam and a second end of the primary torsion bar being connected to a pinion, wherein the torsion bar cam is configured to engage the spool;

a pretensioner coupled to the second end of the primary torsion bar via the pinion, the pretensioner configured to rotate the pinion in a webbing retraction direction when the pretensioner activates in response to an acceleration of the vehicle greater than a predetermined high acceleration;

a secondary torsion bar positioned in the spool, a first end of the secondary torsion bar being connected to the torsion bar cam and a second end of the torsion bar being engaged with a locking mechanism mounted to the frame;

wherein the primary and secondary torsion bars are configured to be locked at the second ends and the first ends are configured to rotate relative to the second ends so that the primary and secondary torsion bars deform to absorb force.

2. The seatbelt retractor of claim 1, further comprising a release mechanism for unlocking the second end of the secondary torsion bar so that the secondary torsion rotates at both ends with the spool and only the primary torsion bar deforms to absorb force.

3. The seat belt retractor of claim 2, wherein the release mechanism comprises a pyrotechnically driven piston.

4. The seat belt retractor of claim 1, wherein the locking mechanism includes a rotatable locking ring with internal teeth engaged with a lock base, wherein the lock base is directly engaged with the second end of the secondary torsion bar.

5. The seat belt retractor of claim 4, wherein the lock base includes a movable locking pawl that engages at least one of the internal teeth of the locking ring in response to a predetermined vehicle acceleration to thereby prevent rotation of the locking base relative to the locking ring.

6. The seat belt retractor of claim 5, wherein the locking ring is engaged by a movable release pawl connected to the frame to thereby prevent rotation of the locking ring relative to the frame.

7. The seat belt retractor of claim 6, further comprising a release mechanism for moving the release pawl out of engagement with the locking ring, and wherein the release mechanism includes a pyrotechnic actuator.

8. The seat belt retractor of claim 7, wherein the pyrotechnic actuator includes a piston and cylinder arrangement and wherein movement of the piston in the cylinder causes a corresponding movement of the release pawl out of engagement with the locking ring.

9. The seat belt retractor of claim 6, wherein the release pawl is moved out of engagement with the locking ring in response to a predetermined condition to thereby permit rotation of the first and second ends of the secondary torsion bar with the spool.

10. A seatbelt retractor for a seat belt device in a vehicle, the retractor comprising: a frame;

a spool configured to be fixed to one end of a seat belt webbing so that the webbing may be wound around the spool, the spool being rotatably mounted at both ends to the frame and configured to rotate in a webbing extraction direction and a webbing retraction direction;

primary and secondary torsion bars positioned end to end in the spool along an axis of rotation of the spool, wherein adjacent first ends of the torsion bars are coupled to an interior surface of a torsion bar cam and wherein the torsion bar cam engages the spool;

wherein the primary and secondary torsion bars are configured to be locked at second ends of the torsion bars opposite to the first ends, and wherein the first ends are configured to rotate relative to the second ends so that the primary and secondary torsion bars deform to absorb force when the vehicle experiences an acceleration greater than a predetermined value.

11. The seat belt retractor of claim 10, wherein the retractor is configured so that the second end of the secondary torsion bar is released to rotate with the first end of the secondary torsion bar while, at the same time, the second end of the primary torsion bar remains locked.

12. The seat belt retractor of claim 11, further comprising a pyrotechnically actuated release mechanism for releasing the second end of the secondary torsion bar.

13. The seat belt retractor of claim 10, further comprising a pretensioner for driving the spool in the webbing retraction direction and locking the second end of the first torsion bar.

14. The seat belt retractor of claim 10, further comprising a locking mechanism for locking and preventing rotation of the second end of the secondary torsion bar, wherein the locking mechanism includes a locking ring rotatable relative to the frame.

15. The seat belt retractor of claim 14, further comprising a movable release pawl connected to the frame that engages the locking ring to prevent rotation of the locking ring relative to the frame.

16. The seat belt retractor of claim 15, wherein the movable release pawl is driven out of engagement with the locking ring by pyrotechnic actuator in response to a predetermined condition to thereby permit rotation of the second end of the secondary torsion bar with the first end of the secondary torsion bar and the spool.

17. A seatbelt retractor for a seat belt device in a vehicle, the retractor comprising:

a frame;

a spool configured to be fixed to one end of a webbing so that the webbing may be wound around the spool, the spool being rotatably mounted in the frame and configured to rotate in a webbing extraction direction and a webbing retraction direction;

a primary torsion bar positioned in the spool, a first end of the primary torsion bar being coupled to a torsion bar cam that is coupled to the spool and a second end of the primary torsion bar being configured to be locked;

a secondary torsion bar positioned in the spool, a first end of the secondary torsion bar being located adjacent to the first end of the primary torsion bar, wherein the first end of the secondary torsion bar is coupled to the torsion bar cam and a second end of the secondary torsion bar being engaged with a locking mechanism mounted to the frame;

wherein the second ends of the primary and secondary torsion bars are configured to be locked when vehicle acceleration exceeds a predetermined value and wherein the first ends are configured to rotate with the spool relative to the second ends so that the primary and secondary torsion bars deform to absorb force; and wherein the retractor includes a release mechanism for unlocking the second end of the secondary torsion bar in response to a predetermined condition so that the secondary torsion rotates at both ends with the spool and only the primary torsion bar absorbs force.

18. The seat belt retractor of claim 17, wherein the locking mechanism includes a locking ring rotatable relative to the frame.

19. The seat belt retractor of claim 18, further comprising a movable release pawl connected to the frame that engages the locking ring to prevent rotation of the locking ring relative to the frame.

20. The seat belt retractor of claim 19, wherein the movable release pawl is driven out of engagement with the locking ring by a pyrotechnic actuator in response to a predetermined condition to thereby permit rotation of the second end of the secondary torsion bar with the first end of the secondary torsion bar and the spool.

* * * * *